United States Patent [19]
Turner

[11] 3,866,159
[45] Feb. 11, 1975

[54] CARRIER BEAM SENSOR
[75] Inventor: William R. Turner, Silver Spring, Md.
[73] Assignee: Automation Industries, Inc., Silver Spring, Md.
[22] Filed: Apr. 2, 1973
[21] Appl. No.: 347,101

[52] U.S. Cl.................................................. 340/3 R
[51] Int. Cl............................. G01s 9/66, G01s 7/66
[58] Field of Search ............ 340/1 R, 3 R, 5 R, 6 R, 340/3 FM; 343/100 CL

[56] References Cited
UNITED STATES PATENTS
3,510,833   5/1970   Turner................................. 340/5 R Primary Examiner—Richard A. Farley
Attorney, Agent, or Firm—Jones, Tullar & Cooper

[57] ABSTRACT

A system for detecting incoming, low-frequency acoustic waves is disclosed, the system including means for randomly generating and transmitting a series of discrete frequency signals into a fluid medium, interacting the signals with discrete continuities in the medium, such as microbubbles, etc. to create back-scattered components of the transmitted signal, and subsequent interaction between the back-scattered components and low-frequency signals in the medium to produce sideband energy. Comparison between a delayed replica of the transmitter signal and the resultant sideband energy permits recovery of the low-frequency signal present in the medium.

21 Claims, 4 Drawing Figures

CARRIER BEAM SENSOR

BACKGROUND OF THE INVENTION

The present invention relates, in general, to systems for detecting low-frequency acoustic signals originating at a source remote from the receiver, and more particularly to a means for transmitting a series of discrete frequency signals which will interact with the acoustic signal to be detected so that the composite signal will be returned to the vicinity of the transmitter where it may be processed to recover the low-frequency signal of interest.

Many receiving systems for detecting underwater sound have been devised in the past. The particular field of this invention was set out in my prior application, Ser. No. 791,882, filed on Jan. 14, 1969, this prior application disclosing a receiving system for underwater sound by which a projector directs a high-frequency carrier beam toward a distant low-frequency sound source and a receiver then detects the resulting sideband energy produced throughout a common interaction volume by interaction between low-frequency sound and the carrier. The present invention is an extension of the principles disclosed in that prior application and includes improved apparatus for developing these principles.

The above mode of interaction may be termed opposing direction conversion because the sideband energy radiates from a region in which the carrier and the low-frequency signals propagate in opposite directions. A critical aspect of opposing direction conversion lies in the recognition that phase reversals, and hence interference, would occur between sideband radiations returning from the neighboring region of an interaction volume spaced one-quarter wavelength apart, and that as a result, the sideband energy would be cancelled at the receiver unless signal strength from each region of reversal diminished with distance.

A method of solving this problem was proposed in application Ser. No. 154,501 to Thomas M. Robertson, filed on June 18, 1971, which provided a reduction of the severe phase cancellation loss by introducing a form of signal processing that would separate the signals from opposing regions of the interaction volume so that they could be individually demodulated and added as constructive signals. The approach suggested the replacement of the previously-used sinusoidal carrier beam with a wide band noise or similar non-coherent or random signal, and comparing the received sidebands in a sequence of correlators against progressively delayed replicas of the transmitted carrier. It has been found, however, that complete reduction of the opposing direction cancellation could not be achieved using practical carrier noise bandwidths, and thus the present invention proposes an improved system which would also solve this latter problem.

SUMMARY OF THE INVENTION

It is, therefore, an object of the present invention to provide an improved system for detecting low-frequency acoustic pressure wave signals from a source.

It is a further object of the invention to provide a system for receiving relatively low-frequency acoustic signals by propagating relatively high-frequency acoustic signals in the opposite direction and receiving the cross-modulation products due to the interaction of the two signals.

It is a further object of the present invention to utilize the phenomenon of the cross-modulation of two acoustic pressure waves which are propagating simultaneously in the same volume of water to produce improved reception of an incoming low-frequency signal.

It is a further object of the present invention to provide a processing circuit for receiving sideband signals produced by a discontinuous interaction of a carrier with a low-frequency signal where a multiplicity of scatterers each independently direct carrier energy backward toward the receiver, which energy then interacts with the low-frequency signal to produce the sideband signals.

An additional object of the present invention is the provision of a means for detecting low-frequency acoustic pressure signals by randomly generating and transmitting a series of discrete frequency carrier signals which are intercepted by discrete discontinuities in a fluid medium such as microbubbles, etc. thus creating a back-scatter of the carrier, and interacting the back-scatter components of the carrier with the low-frequency incoming signals to produce sideband signals which may be received at a receiver, the receiver including means for processing the received signals so as to recover the low-frequency signal.

Briefly, the foregoing is accomplished by providing an acoustic wave generator at a base location which is adapted to project randomly sequenced high-frequency carrier components in the direction of interest. The carrier will contact discrete discontinuities in the fluid medium such as, for example, fish swim bladders, microbubbles, etc., thus creating back-scatter of the carrier in a direction opposite to that in which it is transmitted. Low-frequency signals present in the medium which are traveling in the same direction as the back-scattered components will interact with the back-scattered components to produce sideband energy, the in-phase components of which will accumulate over the remaining path to the sideband receiver.

At the base location, the receiver is formed in the shape of a ring and placed so that it concentrically surrounds the transmitter, which is in the form of a disc. This particular transmitter-receiver geometry is helpful in limiting the effect of carrier backscatter which is strongest in front of the transmitter.

A processing unit is provided to compare signals from the receiver with delayed replicas of the transmitted carrier, the processing unit including a set of narrow rejection filters capable of suppressing the set of discrete frequencies present in the wideband carrier signal. Provision is also made for shaping the transmitted signals to restrict the transient sidebands to the rejection frequencies reserved for the carrier frequencies.

BRIEF DESCRIPTION OF THE DRAWINGS

The foregoing and additional objects, as well as the various novel features which are characteristic of the present invention, will be understood more clearly and fully from the following detailed description and from the recital of the appended claims, taken in conjunction with the accompanying drawings, in which:

DESCRIPTION OF THE PREFERRED EMBODIMENT

Figure 1:
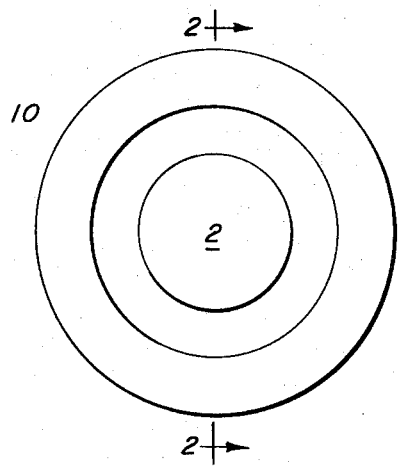
FIG. 1 if a front view of a transmitter-receiver transducer suitable for use in the system of the present invention.
Figure 2:
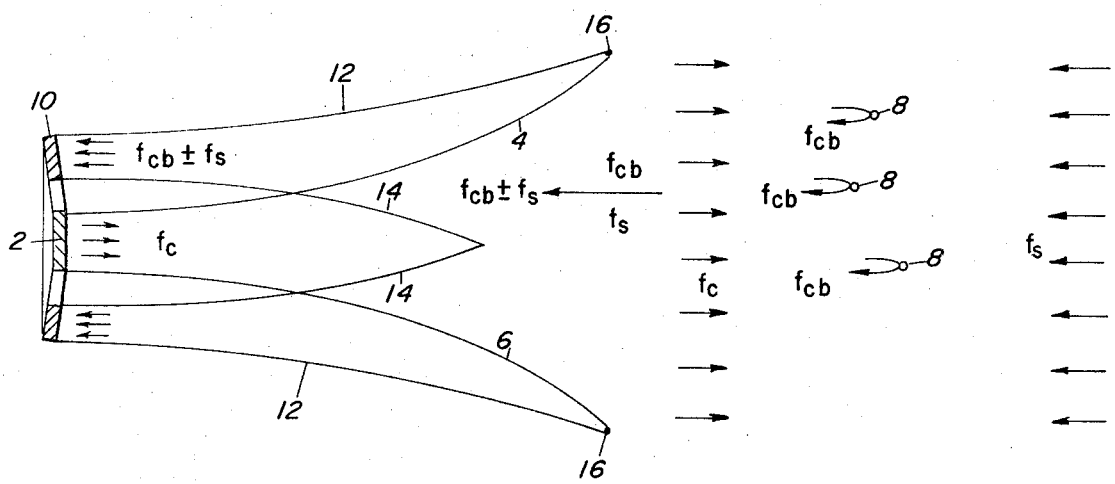
FIG. 2 is a side view of the transmitter-receiver transducer taken along lines 2—2 of FIG. 1 showing the basic principles employed by the present invention.

Turning now to FIGS. 1 and 2, the basic principles of the invention are illustrated diagrammatically for purposes of a clear understanding of the concepts disclosed herein. The wide band carrier signal $f_c$ is shown being emitted from a transmitter 2. The $f_c$ signal will radiate outwardly from the transmitter transducer surface and will begin to spread away from the transducer axis in a cone-shaped pattern as indicated by lines 4 and 6. Signal $f_c$ will continue to radiate outwardly until it is intercepted by discontinuities 8 in the fluid medium which may be particles in the water, fish swim bladders, microbubbles, temperature boundaries, or any of the numerous sound wave reflectors existing in mediums such as large bodies of water. The reradiation by the discontinuities 8 will create a carrier back-scatter $f_{cb}$ in a direction opposite to that in which the original carrier was transmitted. Low-frequency signals $f_s$ which are present in the medium and traveling generally in the same direction as the carrier back-scatter $f_{cb}$ will interact with the carrier back-scatter $f_{cb}$. The resulting sideband energy $f_{cb} \pm f_s$ will accumulate from successive volume elements over the remaining path back to receiver 10.

The arrangement of the transmitter-receiver transducer combination is most clearly shown in FIG. 1 where the disc-shaped transmitter portion 2 of the transducer is shown surrounded by an outer annular receiver portion 10. The purpose of forming the transducer combination in this manner can be seen by referring to FIG. 2, where it is diagrammatically shown that the cross-modulated sideband signal strength $f_{cb} \pm f_s$ will increase with the distance to the scattering region, being finally limited by spreading and attenuation whereas the carrier back-scatter $f_{cb}$ will be strongest immediately in front of the projector. By utilizing an annular receiver in this fashion, the strong carrier back-scatter immediately in front of the transmitter will not fall within the receiving beam patterns 12 and 14 of the receiver portion 10, although it can be seen that the transmitter beam pattern illustrated by lines 4 and 6 converges with the receiver patterns at some distance, indicated by line 16, and thus allows reception of the sideband signal. This particular geometry allows maximum reception from the volume of maximum cross-modulation of the carrier and low-frequency signal, while remaining insensitive to the strong near-field carrier back-scatter. A more complete discussion of the transmitter-receiver combination is provided in my above-mentioned prior application, Ser. No. 791,882.

For this system to operate effectively, the transmitted carrier energy must be constrained to narrow frequency slots that can be rejected in the receiving system without the loss of significant incoming signal strength. The incoming signal will be very weak and any significant noise outside of these slots will obliterate the signal. Such noise can arise from amplitude deviation of a carrier component, frequency deviation of a component, or superimposing of amplifier noise currents.

Figure 3:
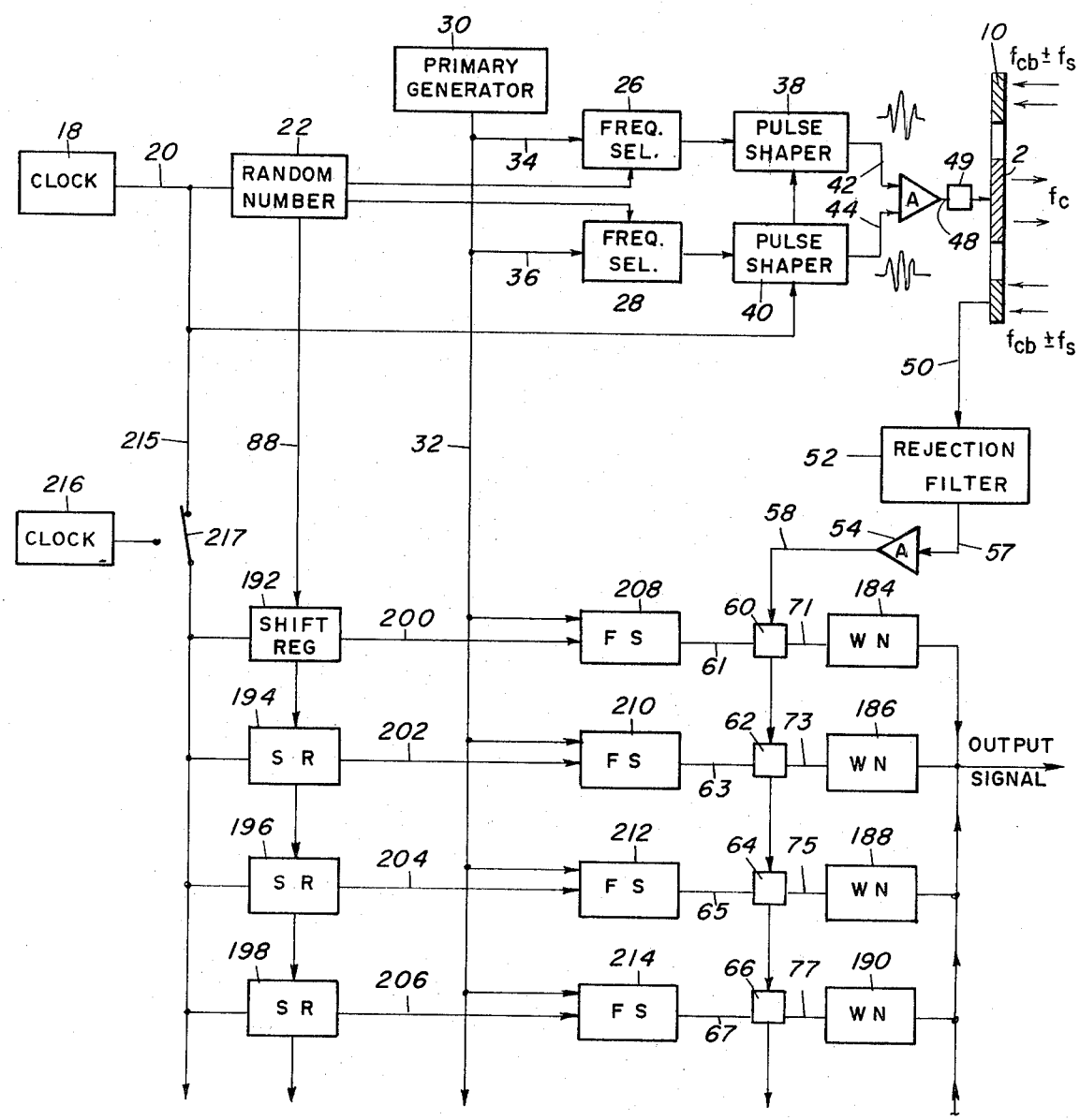
FIG. 3 is a block diagram of the system of the present invention, including the transmitter, receiver, and processing unit circuitry.

The electronic signal transmitting and processing system of the present invention is shown in block diagram form in FIG. 3, the system being used to recover the low-frequency signal detected in the medium. A clock unit 18 produces a train of pulses on line 20 which set the repetition rate for the frequency changes in the outgoing carrier beam for transducer 2. Each pulse initiated on line 20 by clock 18 actuates random number generator 22, which, in turn, tells frequency selectors 26 and 28 which frequency to select within the range of available carrier frequencies, overlapping carrier frequencies being generated alternately by frequency selectors 26 and 28. The frequency selectors receive a plurality of frequencies of high purity produced by primary generator 30 via lines 32, 34 and 36 and gate various selectable carrier frequencies to their respective outputs. If desired, the selectors 26 and 28 may comprise conventional frequency synthesizers. At any specific instant, a random number from generator 22 establishes the frequency of the carrier to be emitted by selector 26. The next random number would then establish the frequency to be emitted by selector 28, the onset of a new frequency being initiated before the previous frequency is completed. Shaping circuits 38 and 40 receive the carrier signals from corresponding selectors and form half-wave sinusoidal tone burst envelopes which overlap each other by 90°, thus producing a constant power signal of selected frequencies for transmitter 2 by way of lines 42 and 44, amplifier 46 and line 48. A filter 49 is used between amplifier 48 and projector 2 to pass carrier energy in assigned slots and reject residual noise in the bands therebetween.

It should be noted that amplitude modulation of a specific carrier frequency will spread carrier energy outside of the slot assigned to that specific frequency; that is, the spreading cannot be avoided if a sequence of distinct tones are amplitude modulated before transmission. Thus, the present invention uses the approach of shaping the modulation envelope by means of shaping circuits 38 and 40 so that the spread energy will fall into slots assigned to other primary frequencies. A rectangular envelope cannot be used because a continuous spectrum of sidebands results, but if a continuous sinusoidal modulation is used, only two sidebands will exist, spaced at modulation frequency intervals on each side of the primary frequency. However, this does not provide a beginning and end for a carrier components. On the other hand, if the envelope is half of a sinusoidal wave, additional sidebands will exist but each will be harmonically related to the first. Thus, if the primary frequencies are equally spaced, and the pulse modulation envelope properly shaped, the carrier energy spread outside the slot assigned to a specific frequency will fall only within the slots established for the other primary frequencies.

Once the carrier $f_c$ has been transmitted by projector 2, back-scattered by the discontinuities 8 within the medium, and the back-scattered signal $f_{cb}$ cross-modulated with the low-frequency signal $f_s$ present in the medium, the cross-modulated products $f_{cb} \pm f_s$ will return to the receiver 10 where they are immediately fed by way of line 50 into a rejection filter 52 which is located between the receiving transducer and input preamplifier 54. The rejection filter 52 may comprise a series of quartz resonators acting as traps in parallel and is used to reduce those components of the transmitted carrier which could cause serious interference by overloading preamplifier 54. Thus the receiver is receiving sidebands related to the transmitted components, but the components themselves are greatly reduced in strength. Additional traps on either side of the selectable frequencies may be required to eliminate higher order harmonics. The band width of each trap within the rejection filter 52 need be only as wide as will confine the fluctuation of the reverberant signal. This band width, then, sets the lowest frequency signal that can be detected.

After the signal is received by receiver 10, passed through line 50 into rejection filter 52, and is fed by way of line 57 to amplifier 54, the signal will then be applied via line 58 simultaneously to a set of detectors 60, 62, 64 and 66. Each detector also receives a delayed replica of the transmitted signal provided over lines 61, 63, 65 and 67, respectively, by a method described below, to convert the received sidebands for a particular range interval into the original low-frequency signal when the replica and received signals are related; specifically, when the replica is the carrier to which the sidebands are related.

Figure 4:
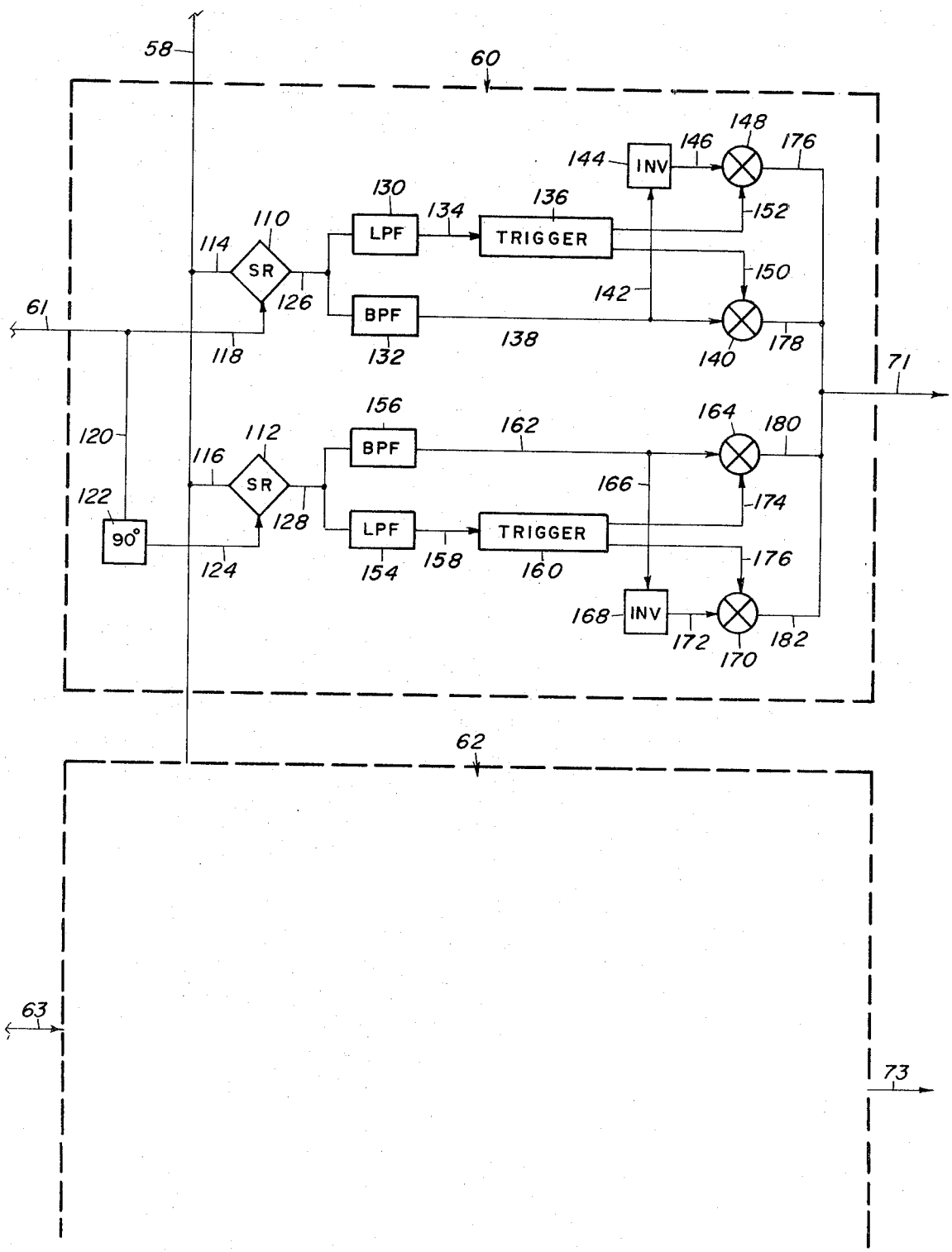
FIG. 4 is a detailed block diagram of the detector shown generally in FIG. 3 and its associated coherence selector.

The detector circuitry is shown in more detail in FIG. 4. The discussion of the detector circuitry will be conducted in connection with the detector unit 60 although it will be readily understood that the other detector units 62, 64, and 66 operate in the same manner. Turning to FIG. 4, the received signal is fed to the detector unit 60 by way of line 58, as described above. The received signal, which may be returning from various distances from the transducer and thus represents different volume segments, will be comprised of residual components of the carrier as well as the low-frequency modulation sidebands. Each set of sidebands will be related in phase to the residual carrier back-scattered by the specific scatterer, but the residual carrier and related sidebands from different scatterers will be randomly phased. Since the phase relationships between the various reflected components of the received signals are not fixed, it is necessary to provide multiple phase choices and the means for selecting only those components of the received signal that will add in phase, thereby to produce an accumulative signal at the circuit output that will represent the incoming low-frequency signal to be detected. This is accomplished in the circuit shown in FIG. 4, wherein a diversity reception is provided by deriving quadrature and complementary signals from a pair of synchronous rectifiers 110 and 112 yielding multiple phase choices and by using the related residual carrier for switching. The received signal is fed from line 58 through line 114 to synchronous rectifier 110 and through line 116 to synchronous rectifier 112. A delayed replica of the transmitted carrier is provided from a source to be described by way of lines 61 and 118 to the synchronous rectifier 110. This delayed carrier is also fed through line 120 to a phase shift unit which shifts the phase of the carrier by 90°, to provide a quadrature signal input to synchronous rectifier 112 via line 124. If the received signal on line 114 is in phase or 180° out of phase with respect to the delayed replica on line 117, synchronous rectifier 110 will pass the received signal through to an output line 126. On the other hand, since a 90° phase shifted replica is referenced to line 124, through lines 120 and phase shift unit 122, any received signal which is 90° or 270° out of phase with respect to the delayed replica on line 61 will be passed through synchronous rectifier 112 to its output line 128.

The signal appearing on the output line 126 from synchronous rectifier 110 is fed to a low pass filter 130 and to a parallel band pass filter 132. The output of the low pass filter is the residual carrier phase signal appearing on line 126, and this phase component is fed by way of line 134 to the input of a trigger circuit 136. The band pass filter 132 passes those rectified or demodulated components of the received signal which comprise the low-frequency signal. This signal is fed by way of a line 138 to a first gate 140, and by way of a line 142 to an inverter 144. The output of the inverter passes by way of line 146 to a second gate 148. The operation of gates 140 and 148 is controlled by two outputs from trigger circuit 136, one output being by way of line 150 to gate 140 and the other output being fed by way of line 152 to gate 148, whereby the trigger circuit selects one gate or the other to produce an output.

In similar manner the signal appearing on the output line 128 from synchronous rectifier 112 is fed to a low pass filter 154 and to a parallel band pass filter 156, with the residual carrier phase signal being fed from the low pass filter by way of line 158 to the input of a trigger circuit 160. The band pass filter 156 feeds the demodulated low-frequency signal by way of line 162 to a third gate 164 and by way of line 166 to inverter 168. The inverter output is applied to a fourth gate 170 by way of line 172. Again, the operation of gates 164 and 170 is controlled by two outputs from trigger 160, one output being fed by way of line 174 to gate 164 and the other output being fed by line 176 to gate 170, whereby trigger 170 selects either gate 164 or gate 170 to produce an output. The outputs from the four detector gates 140, 148, 164, and 170 are applied by way of output lines 176, 178, 180 and 182, respectively, to a common detector output line 71.

It will be seen that by reason of the inverters 144, the signals applied to gates 140 and 148 are 180° out of phase with each other, and that inverter 168 causes the output of gate 170 to be 180° out of phase with the output from gate 164. Further, because the signals on line 128 are in quadrature with the signals on line 126, the outputs of gates 164 and 170 will be in quadrature with the outputs of gates 140 and 148, respectively; thus, if a received signal applied to line 58 were to be rotated through 360°, a correctly phased low-frequency signal would appear sequentially at the outputs of the four gates, and on the common output line 71. However, the gates will not pass the modulated signal to the output unless they receive appropriate triggering pulses from the triggers 136 and 160. Selection of the correct output is accomplished by utilizing the back-scattered carrier phase signals which were separated by the low pass filters 130 or 132, as the switching signal. If the carrier phase signal on line 134 is positive, that is, the carrier is in phase rather than 180° out of phase with respect to the delayed replica on line 61, and also above a prescribed threshold level, the positive output on line 150 to gate 140, is selected and the demodulated signal on line 138 is fed by way of this gate to output line 178 and 71. If the carrier signal is negative, or 180° out of phase with respect to the delayed replica, the other output, line 152 to gate 146 is selected and the demodulated signal on line 138 is fed by way of this gate to output line 176. Since this modulation signal is inverted by inverter 144, it will also appear as a coherent output on lines 176 and 71.

Trigger 160 similarly operates to regulate gates 164 and 170 in response to the amplitude and polarity of the signal applied to the trigger input.

To summarize, if synchronous rectifier 110 detects a signal on line 58 which is either in phase or 180° out of phase with the delayed replica of the transmitted signal on line 61, the rectifier 110 will pass that signal to its output line 126. Likewise, rectifier 112 will be watching for signals either 90° or 270° out of phase with respect to the replica on line 61. The residual carrier phase signal will be filtered out from the signal on line 126 by low pass filter 130 and used to trigger either gate 140, if the received signal is in phase with the delayed replica (e.g., is positive) or gate 148 if it is 180° out of phase (e.g., is negative). The demodulated low-frequency signal will be filtered by band pass filter 132 and directed to gate 140 and, after being inverted, to gate 148. If the carrier phase signal is positive, the demodulated signal is also positive and will be passed through gate 140 to the output 71. If the carrier is negative, the demodulated signal is also negative but will be inverted before being passed through gate 148 to the output 71. In either event, a positive demodulated signal appears on output 71. Similarly, when the received signal is either 90° or 270° out of phase with the delayed replica on line 61, the rectifier 112 will pass the received signal to its output line 128. This signal will be positive if it is 90° out of phase, because of the phase shifting of the replica by shifter 122, and will be negative if it is 270° out of phase. The polarity of the carrier phase signal then operates the trigger 160 to open either gate 164, if positive, or gate 170, if the carrier is negative, thereby to feed the demodulated signal or the inverted demodulated signal to the output line 71.

Each of the detectors 60, 62, 64 and 66 are similar, and each produces output signals on its corresponding output 71, 73, 75 and 77 in accordance with the correspondence between the signals received on line 58 and the delayed replicas on lines 61, 63, 65 and 67. By referring back to FIG. 3, it can be seen that the delayed replicas of the transmitted signal on lines 61, 63, 65 and 67 are produced separately. As will be further explained hereinbelow, each replica is delayed in time from the one immediately above, thus providing a continuous range of detection. Each detector provides an independent coherent output derived from non-linear interaction of the low-frequency with the backscattered carrier from a discrete scatterer (or limited group of scatterers,) as determined by the delay time and the clock intervals. By summing the detector outputs, the signal approaching the sensor along the beam axis can be maximized. Side lobes in the directivity pattern can be suppressed by corresponding amplitude weighting networks 184, 186, 188 and 190 at corresponding outputs 71, 73, 75 and 77 of each detector 60, 62, 64 and 66.

The delayed replicas of the transmitted signal are obtained by propagating a digital frequency code along a set of parallel activated shift registers 192, 194, 196 and 198. This code is obtained from the random number generator 22 and is applied to the set of shift registers to produce delayed carrier replicas that are simultaneously directed through outputs 200, 202, 204 and 206 to corresponding frequency selectors 208, 210, 212, and 214. The output from primary generator 30 is also supplied by way of line 32 to each of the receiver frequency selectors 208, 210, 212 and 214 so that for every frequency selected by transmitter frequency selectors 26 and 28, a corresponding frequency will be selected at a delayed time in each of the receiver selectors, each selector holding the frequency signal for a predetermined period corresponding to a specified distance of travel for the transmitted frequency and then listening for the next discrete frequency transmitted. For example, if it is known that random number generator 22 was going to select a series of random numbers X, Y, and Z, the first pulse transmitted by clock 18 would cause random number generator 22 to gate the frequency selector 26 to select and transmit frequency X. At the same time, the pulse initiated by clock 18 travels down line 215, through a switch 217 which is in the position shown in the drawing, to cause each of the shift registers 192, 194, 196 and 198 to shift the digital code received from number generator 22 to the next register. Since X is the first code in the series X, Y and Z, it will enter register 192, which in turn passes the code to frequency selector 208 via line 200, gating the selector 208 to select frequency X from the plurality of frequencies delivered from primary generator 30 via line 32. The selector 208 then feeds frequency X to detector 60 which converts a signal referenced to that frequency received from the medium. When the second pulse is triggered by clock 18, random number generator 22 gates frequency selector 28 to select and transmit frequency Y. The second clock pulse also causes register 102 to shift code X to register 194 and enter code Y in register 192. Through its associated circuitry, register 192 now causes corresponding detector 60 to listen for Y referenced signals while register 194 is now causing detector 62 to listen for X referenced signals. The third clock pulse causes (1) frequency Z to be transmitted into the medium, (2) register 194 to shift code X to register 196 and enter code Y from register 192, and (3) register 192 to shift code Y to register 194 and enter code Z from the random number generator. Thus, it can be seen that any of the discrete frequencies transmitted can be received from any number of different distances, detector 60 listening for the first segment travel time, detector 62 for the second segment, detector 64 for the third segment, and so forth.

This feature in combination with the ability of each detector to respond to a plurality of phases for each frequency, as described above, provides a complete diversity reception system.

Beam steering to provide an accurate indication of the direction of the source of the received sound can be accomplished in this system by employing a separate clock pulse source 216 for the shift registers 192, 194, 196 and 198. The clock 216 operates at a lower pulse repetition rate than the clock 18, which times the pulse transmission rate. This lower rate will maximize signals approaching the carrier beam axis at an angle, and will thereby define a conical reception pattern. If this latter feature is desired, switch 217 is moved to the position opposite to that shown in the drawing so that the registers are controlled by clock 216.

By modifying the invention so that a second carrier beam sensor is used, the ambiguity of reception direction within this conical pattern can be reduced to two directions, simply by pointing the second carrier beam sensor along a different axis. A common carrier projection might be employed for two or three receivers aimed in slightly different directions around the projector axis. In this latter case, an ultrasonic lens could also be used to focus the sideband energy arriving from three slightly different directions. A more complete discussion of the beam steering concept is provided in the above-referenced application to Thomas M. Robertson.

Thus, there has been described a new and improved apparatus for detecting and isolating incoming acoustic waves. Although the invention has been described with respect to a specific embodiment, it will be recognized that in reality a much larger number of detectors and associated circuitry would be used as well as be apparent to those skilled in the art that various modifications and changes may be made without departing from the true spirit and scope of the invention as described in the following claims.

I claim:

1. An improved method of detecting and isolating incoming acoustic waves comprising:
   a. randomly generating a series of discrete frequency signals and projecting said signals into a medium;
   b. reacting said projected signals with discontinuities present in said medium to create back-scattered components of said discrete frequency signals;
   c. modulating said back-scattered components with said incoming acoustic waves to produce cross-modulation products;
   d. receiving said cross-modulation products; and
   e. comparing said received cross-modulation products with delayed replicas of said discrete frequency signals whereby said received products are converted into an output signal corresponding to said incoming acoustic waves.

2. The method of claim 1 wherein the step of comparing said received products with delayed replicas of said discrete frequency signals includes the steps of:
   a. feeding a code series into a network of shift registers, each code in said series being representative of one frequency in said series of discrete frequencies;
   b. sequentially shifting each said code to each register in said network of registers;
   c. producing an output from each said register when each said code is present;
   d. using the output from each register to produce a replica of the frequency in said series of discrete frequencies of which said code was representative;
   e. feeding said received cross-modulation products in parallel to a plurality of detectors, each said detector receiving replicas produced in response to the outputs from a particular one of said shift registers;
   f. comparing in each said detector the discrete-frequency portion of said received cross-modulation products with said replicas in both in phase and quadrature form; and
   g. providing an output signal from each said detector when said discrete frequency portion of said received products is coherent with said delayed replica and above a predetermined amplitude.

3. The method of claim 2, wherein the step of randomly generating a series of discrete frequency signals includes the steps of:
   a. setting the repetition rate for the frequency changes in a frequency generator;
   b. randomly selecting a discrete frequency from a plurality of available frequencies;
   c. generating the next frequency in said series of discrete frequencies before said previous frequency has ended; and
   d. shaping said generated carrier frequencies so that any spread energy will fall into slots assigned to other discrete frequencies.

4. The method of claim 1, further including projecting said discrete frequency signals and receiving said cross-modulation products in geometrical patterns to reduce the reception of near-field carrier backscatter.

5. The method of claim 1, further including projecting said discrete frequency signals along a projection path to form a generally cone-shaped pattern for reaction with discontinuities in said medium; and
   receiving said cross-modulation products along a reception path spaced from but converging with said projection path, whereby said received cross-modulation products do not include near-field back-scattered carrier signals.

6. The method of claim 1, wherein the step of comparing said received cross-modulation products with delayed replicas of said discrete frequency signals includes feeding said received signals simultaneously to a plurality of detector circuits and feeding to each detector in sequence progressively delayed replicas of said discrete frequency signals, each of said detectors producing an output when its received signals are related to its delayed replicas, the sum of the outputs of said detectors corresponding to said incoming acoustic waves.

7. The method of claim 6, further including comparing in each said detector the discrete frequency portion of said received cross-modulation products with said delayed replicas; and providing an output signal from each said detector when said discrete frequency portion of the received cross-modulation products is coherent with said delayed replicas and above a predetermined amplitude.

8. A system for detecting and isolating incoming acoustic waves comprising:
   a. means for randomly generating a series of discrete frequency signals;
   b. means for projecting said series of discrete frequency signals into a medium, said projected signals continuing in said medium until said projected signal encounters discontinuities in said medium which back-scatter portions of said projected signal, thus creating back-scattered components which cross-modulate with said incoming acoustic waves to form cross-modulation products;
   c. receiver means for receiving said cross-modulation products, said receiver means including a plurality of detectors;
   d. means for feeding said received cross-modulation products simultaneously to said plurality of detectors; and
   e. means for feeding to each said detector a replica of a discrete signal from said series of discrete frequency signals for comparison to said received cross-modulation products, each said detector producing an output signal corresponding to said incoming wave when said delayed replica is the carrier to which said received cross-modulation products are related.

9. The system of claim 8 wherein each said detector includes first and second synchronous rectifiers, said first synchronous rectifier comparing said received cross-modulation products with an in-phase replica of said discrete signal, said second synchronous rectifier comparing said received cross-modulation products with a quadrature replica of said discrete signal.

10. The system of claim 9 wherein said detector further includes a filtering means for each of said first and second synchronous rectifiers, said filtering means being capable of separating the output produced by either said first or second synchronous rectifier, upon a coherent comparison, into a discrete frequency phase signal and an incoming acoustic wave component.

11. The system of claim 10 wherein said detector further includes first and second output gates for each of said first and second synchronous rectifiers, said incoming acoustic wave component being fed to both said first and second output gates of said first and second synchronous rectifiers.

12. The system of claim 11 wherein said detector further includes an inverting means for each of said first and second synchronous rectifiers for inverting the incoming acoustic wave being fed to said second output gate of each said rectifier.

13. The system of claim 12 wherein said detector further includes a trigger means for each of said first and second synchronous rectifiers, said trigger controlling said output gates and being responsive to the polarity of said discrete frequency phase signal to select first output gate when said discrete frequency phase signal is positive and said second output gate when said discrete frequency phase signal is negative.

14. The system of claim 13 wherein said detector further includes means for producing a composite output which comprises the outputs from said first and second output gates of said first synchronous rectifier, and the outputs from said first and second output gates from said second synchronous rectifier.

15. The system of claim 8 wherein said means for randomly generating a series of discrete frequency signals includes a clock means for setting the repetition rate for frequency changes.

16. The system of claim 15 wherein said means for randomly generating a series of discrete frequency signals further includes a random number generator actuated by said clock means to produce a random discrete frequency within a range of available frequencies.

17. The system of claim 16 wherein said means for randomly generating a series of discrete frequency signals further includes first and second frequency selectors, said selectors combining to generate overlapping carrier frequencies.

18. The system of claim 17 wherein said means for randomly generating a series of discrete frequency signals further includes a pulse shaper means for shaping the outputs of each of said first and second frequency selectors to restrict the spread energy from said discrete frequencies into slots assigned to other of said discrete frequencies.

19. The system of claim 8, wherein said means for projecting comprises a disc-shaped transmitter transducer and said receiver means comprises an annular receiver transducer surrounding said transmitter transducer.

20. The system of claim 8, wherein said means for projecting comprises a transmitter transducer and said receiver means comprises a receiver transducer, said transducers being spaced from each other so that said receiver is insensitive to near-field carrier back-scatter.

21. The system of claim 20, wherein said transmitter transducer projects said discrete frequency signals in a first pattern and said receiver is responsive to cross-modulation products in a second pattern, said patterns converging at a distance from said transmitter and receiver transducers.

* * * * *